United States Patent [19]
Pary et al.

[11] Patent Number: 5,789,719
[45] Date of Patent: Aug. 4, 1998

[54] METHOD AND APPARATUS FOR ELECTRICAL RESISTANCE SPOT WELDING

[75] Inventors: James Pary, St. Clair Shores; Michael L. Hallack, Warren; Chuck Beach, Troy; Ariel Stiebel, Detroit, all of Mich.

[73] Assignee: Milco Manufacturing Co., Warren, Mich.

[21] Appl. No.: 625,341

[22] Filed: Apr. 1, 1996

Related U.S. Application Data

[63] Continuation-in-part of Ser. No. 180,545, Jan. 12, 1994, Pat. No. 5,504,297, which is a continuation-in-part of Ser. No. 859,991, Mar. 30, 1992, abandoned, which is a continuation-in-part of Ser. No. 694,937, May 2, 1991, Pat. No. 5,111,020.

[51] Int. Cl.[6] .................. B23K 9/32; B23K 9/28
[52] U.S. Cl. .................. 219/86.25; 219/89; 219/86.8
[58] Field of Search .................. 219/86.25, 89, 219/41, 51, 61, 91, 92, 86.8

[56] References Cited

U.S. PATENT DOCUMENTS

| | | |
|---|---|---|
| 2,876,746 | 3/1959 | Storrs . |
| 2,952,765 | 9/1960 | Droste . |
| 3,008,032 | 11/1961 | Wolfbauer, Jr. . |
| 3,350,987 | 11/1967 | Johnson . |
| 3,396,260 | 8/1968 | Waltonen . |
| 3,398,651 | 8/1968 | Folmer . |
| 3,553,420 | 1/1971 | Shearer, Jr. ............... 219/110 |
| 3,580,140 | 5/1971 | Walker . |
| 3,605,568 | 9/1971 | Nepp . |
| 3,889,094 | 6/1975 | Needham . |
| 4,352,971 | 10/1982 | Slade . |
| 4,784,044 | 11/1988 | Klement . |
| 4,812,612 | 3/1989 | Perkins . |
| 4,861,959 | 8/1989 | Cecil . |
| 5,032,704 | 7/1991 | Neff et al. . |
| 5,036,175 | 7/1991 | Umeda . |
| 5,115,113 | 5/1992 | Miller . |
| 5,146,440 | 9/1992 | Yamaguchi et al. . |

*Primary Examiner*—Peter S. Wong
*Assistant Examiner*—Rajnikant B. Patel
*Attorney, Agent, or Firm*—Gifford, Krass, Groh, Sprinkle, Patmore, Anderson & Citkowski, P.C.

[57] ABSTRACT

An improved welding apparatus and method of use including a pair of opposed electrodes mounted on arms which are fixed against outward displacement during the application of the welding current. One of the arms includes a cylinder for moving an electrode to and away from the work piece. The cylinder includes a pilot operated check valve which permits a one-way flow of hydraulic fluid while the weld current is applied. The check valve prevents movement of the electrode away from the work piece during expansion of the weld nugget, however, permits inward movement of the electrode after the nugget is softened.

8 Claims, 6 Drawing Sheets

METHOD AND APPARATUS FOR ELECTRICAL RESISTANCE SPOT WELDING

This is a Continuation-in-part of application Ser. No. 08/180,545 filed on Jan. 12, 1994, now U.S. Pat. No. 5,504,297 which is a Continuation-in-part of Ser. No. 07/859,991, filed Mar. 30, 1992, now abandoned which is a Continuation-in-part of Ser. No. 07/694,937, filed May 2, 1991, which has now issued as U.S. Pat. No. 5,111,020, issued May 5, 1992.

BACKGROUND OF THE INVENTION

Field of the Invention

Stiebel, U.S. Pat. No. 4,419,558 (Dec. 6, 1983) and A. Stiebel, C. Ulmer, D. Kodrack, B. Holmes, "Monitoring and Control of Spot Weld Operations," *SAE Technical Paper Series*, No. 860579 (1986), Issue No. 148-7191 describe monitoring and controlling electrical resistance spot-welding by measuring displacements of the electrodes during welding. After the squeezing force is applied by the electrodes to the work pieces and the supply of welding current is initiated, the metal at the work site first expands thermally as it heats (expansion) and then flows plastically as it softens and fuses (indentation). The electrodes are displaced by the expansion and indentation of the metal at the weld site as well as by the expansion and contraction of the electrodes. Thus, measurements of the displacement of the electrodes during formation of the weld contain information indicative of the state of the metal at the weld site.

It has long been known that moderate indentation almost always ensures a good weld. The ability to measure the onset of indentation makes it possible, therefore, to shut off the welding current upon detection of indentation with a high level of assurance that a good weld has been formed. The Stiebel patent and the Stiebel et al technical paper referred to above are incorporated by the foregoing reference to them into the present specification.

In the method and apparatus of the Stiebel patent (and the Stiebel et al. technical article) consistent measurements of displacement are assured by interposing a mechanical compression spring between the piston of an air cylinder (or its equivalent) that moves the movable electrode into engagement with the work piece and a stationary electrode.

A load cell associated with the spring detects the changes in the load imposed on the spring as the movable electrode is displaced upon expansion and indentation of the metal of the work pieces at the weld site during formation of the weld. Compressing the spring during expansion provides changes in the resulting forces in the spring and thus on the load cells that are directly proportional to the displacement of the movable electrode. Without the spring, for example with a hydraulic or pneumatic cylinder directly working on the movable electrode, the piston is theoretically free to displace with the movable electrode in direct correspondence with the electrode movements, thus providing no change in load and no opportunity to detect electrode displacements by detection of load changes.

SUMMARY OF THE INVENTION

It has been discovered that greatly improved welding characteristics may be had by fixing the electrodes in position against outward displacement when the metal work pieces expand during the application of welding current and permitting inward displacement of the electrodes after the softening of the metal nugget. Disclosed is a welding apparatus having a frame supporting a pair of arms having welding electrodes. At least one of the pair of arms is connected to a pneumatic cylinder operable for moving an electrode against a work piece and placing a squeezing force by the electrodes on the work piece.

Air pressure is supplied to the cylinder during the welding cycle to maintain the squeezing force on the work piece. The squeezing force is opposed by a counterforce of the metal work pieces.

The pneumatic cylinder includes a brake for preventing an outward displacement of electrodes during thermal expansion of the weld nugget. The brake includes a plurality of wedges which are disposed in an axial bore within the piston rod and movable outwardly to frictionally engage the inner surface of the axial bore of the piston rod.

The frictional force of the brake is controlled to be equal or slightly greater than the expansion force of the weld nugget to hold the cylinder against outward displacement during expansion of the weld nugget. However, after the metal softens, the counterforce of the metal is reduced so that the squeezing force is greater than the counterforce of the nugget and frictional force of the brake to permit the electrode to travel inwardly to form indentation.

A first alternative preferred embodiment of the invention is also disclosed. The first alternative embodiment includes a pneumatic cylinder having an electrically operated brake. A ball screw assembly connects a unidirectional clutch and a piston rod. The piston rod is connected to at least one of the electrodes. The brake assembly is operable with the unidirectional clutch to lock the electrodes against outward displacement during the weld cycle. However, the unidirectional clutch and ball screw assembly permit the piston rod and electrode to move inwardly after the metal of the work piece softens to cause indentation.

A second preferred alternative embodiment includes a pneumatic cylinder having a piston rod having a working end extending from one end of the cylinder and a rod extension with friction pads extending from a cylinder cap on an opposite end of the cylinder. A brake assembly is movably mounted to the cylinder cap on a pair of pins. The brake assembly is spring-biased away from the cylinder. The brake assembly has self-centering apparatus provided to permit the brake assembly to frictionally engage the friction pads of the rod extension to lock the rod against outward movement during expansion of the weld nugget. The pins and springs permit inward movement of the piston rod and electrode after the metal of the work piece is softened.

A third preferred alternative embodiment of the welding apparatus includes a pneumatic cylinder having a hydraulic brake circuit. The pneumatic cylinder operates in a conventional manner to move a rod carrying an electrode. The brake circuit includes a piston affixed to the rod movable within a hydraulic chamber. When the rod is extended pneumatically, the hydraulic piston in the hydraulic chamber moves with the rod to displace fluid from a forward part of the hydraulic chamber through a passage in the housing to a rearward portion of the chamber on the opposite side of the piston. A pilot pressure controlled, one-way check valve is mounted in the passage so that the hydraulic fluid can pass through the passage in only one direction. The check valve, thus, permits forward movement of the piston and rod but prevents rearward movement of the piston and piston rod. The electrode and piston are thus locked from outward movement from the work piece during expansion of the weld nugget but permits the electrode to move inwardly to the work piece after the weld nugget is softened. A controller activates a valve to apply pilot pressure to the check valve to permit rotation of the rod and electrode after the welding current has been terminated.

A fourth preferred alternative embodiment of the welding apparatus includes a hydraulic cylinder with a pilot pressure controlled one-way check valve mounted in a passage delivering an inflow of fluid for moving the rod outwardly. An outflow of fluid is not permitted by the valve from the work piece so rearward movement of the rod and electrode is prevented by the check valve. When a strain gauge mounted to the cylinder indicates that the weld nugget is properly formed, a signal is sent by the controller to terminate the weld current and dump the pilot pressure to release the check valve, thereby permitting the piston to move in the rearward direction when fluid is applied to retract the piston. The check valve permits forward movement of the rod into the work piece after softening the weld nugget and prevents rearward movement of the piston during expansion of the nugget.

Also disclosed is a method of welding, including the steps of squeezing the electrodes against the work piece with a predetermined squeezing force, fixing the electrodes against outward displacement, applying a welding current to form a softened weld nugget, and permitting the electrodes to move inwardly after the softening of the metal of the work piece.

The method and apparatus of the invention provides a weld with greatly improved welding characteristics. By locking the electrodes in position against expansion during the application of welding current, there is a reduction in sparking and resulting spark expulsion of the weld nugget. Additionally, the fixing of the electrodes against outward displacement results in increased pressure being applied to the weld nugget as a result of the expansion of the nugget during the application of the weld current. This increased pressure results in an improved weld. The method and apparatus also permit proper indentation of the nugget after softening of the metal.

Additionally, the apparatus and method are advantageously used in conjunction with piezoelectric strain gauges for controlling weld current, as disclosed in co-pending patent application Ser. No. 694,937.

DESCRIPTION OF THE DRAWING

The present invention will be more fully understood by reference to the detailed description of the preferred embodiments of the present invention when read in conjunction with the accompanying drawing, in which like reference characters refer to like parts throughout the views, and in which.

DETAILED DESCRIPTION OF A PREFERRED EMBODIMENT

Figure 1:
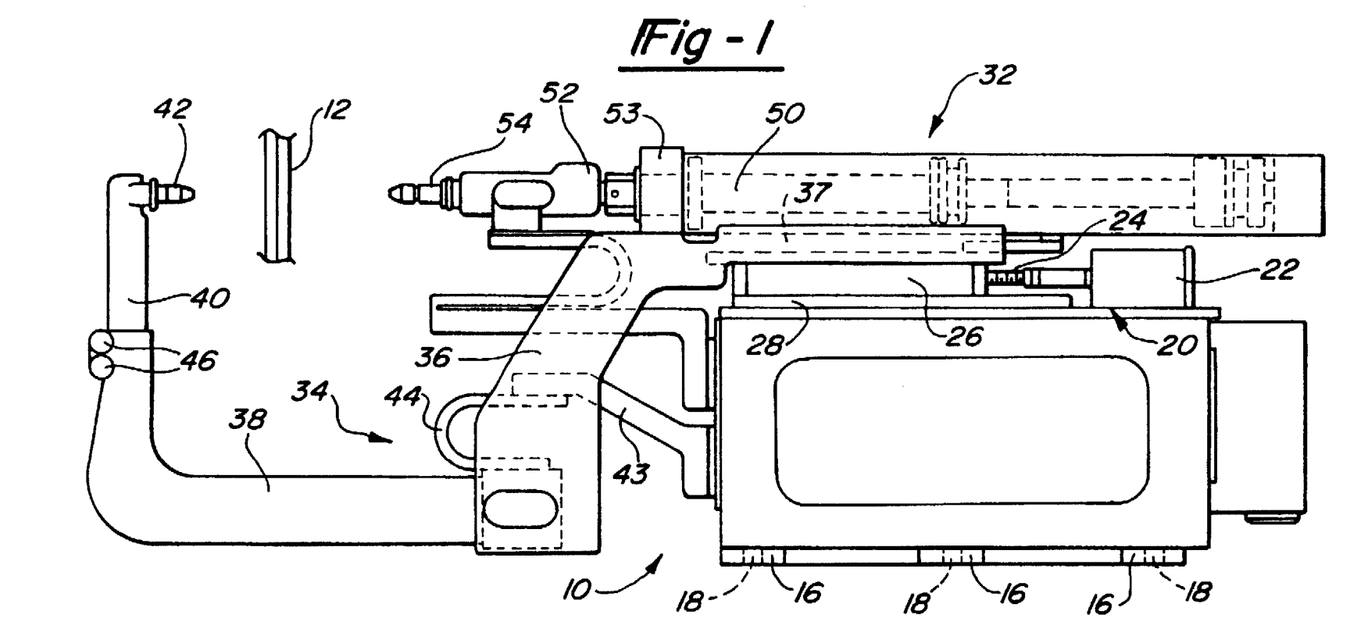
FIG. 1 is a side view of a welding apparatus in accordance with the invention shown in a retracted position.

Shown in FIG. 1 is an embodiment of a welding apparatus 10 embodying the invention of a type for use in the welding of a work piece 12, by electrodes 42 and 54. The welding apparatus shown is particularly suitable for welding car and truck bodies. The welding apparatus 10 has a rigid frame 14 including flanges 16 extending along one side of the frame. Each flange 16 has a bore 18 for accepting a fastener to secure the frame to a robotic arm (not shown) which is used to position the welding apparatus. The frame may be secured to a machine or by an independent hanger.

Mounted to a top surface 20 of the frame 14 is a pressure equalizing device including a slide bar 26, an inner arm 32 and an outer arm 34 for use in balancing the pressure exerted on the work piece by the electrodes 42 and 54. The slide bar 26 is reciprocally movable on a pair of rails 28 along the top surface 20 of the frame 14. A biasing member 22, such as a spring or pneumatic cylinder, is connected by a threaded rod 24 to the slide bar 26 to force the slide bar in the direction of the work piece 12.

As shown in FIG. 1, the inner arm 32 and an outer arm 34 are fixedly mounted to the slide bar 26. The outer arm 34 includes a mounting bracket 36 having an elongated portion 37 mounted to the slide bar 26. Extending from a free end of the mounting bracket 36 is an L-shaped member 38 supporting a conventional electrode holder 40 and the electrode 42. Electrical current is delivered to the electrode 42 by conductive material disposed within the electrode holder 40 and L-shaped member 38. Electrical current is carried from a supply of electrical power carried at the frame by an extension bar 43 and wire 44. The wire 44 is flexible to facilitate movement of the outer arm 34. The electrode holder 40 is removable from the L-shaped member 38 by rotating threaded locking members 46.

As best shown in FIG. 1, the inner arm 32 includes a pneumatic cylinder 48 having a piston rod 50 supporting an electrode holder 52 and the electrode 54. The pneumatic cylinder 48 is bolted to elongate portion 37 of the mounting bracket 36.

When pressurized, the pneumatic cylinder 48 is operable to extend the piston rod 50 and the electrode 54 to contact the work piece 12. The cylinder is pressurized sufficiently to overcome the force of the biasing member 22, to move the slide bar away from the work piece and draw the electrode 42 to the work piece and place a predetermined squeezing force on the work piece. The squeezing force is sufficient to hold the electrodes firmly in contact with the work pieces, but not so great as to deform the electrodes or work piece. The force varies according to the composition of the material of the work piece and electrodes. The slide bar and spring permit equalization of the pressure put on the sides of the work piece by the electrodes 42, 54.

Figure 3:
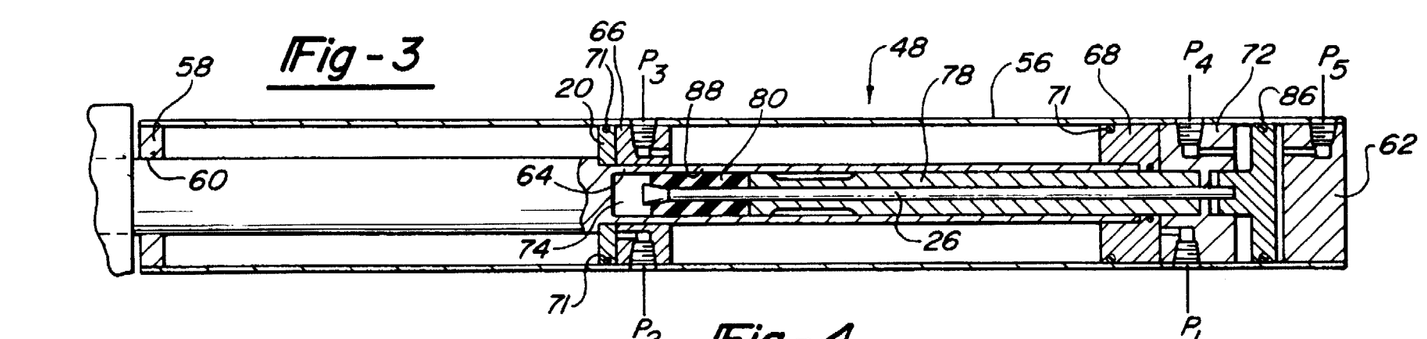
FIG. 3 is a sectional view of a pneumatic cylinder with the piston in a retracted position.

As best shown in FIG. 3, the pneumatic cylinder 48 includes a cylindrical barrel 56 having an end piece 58 at one end and a cap 62 at the opposite end. The piston rod 50 extends through a bore 60 in the end piece 58 and a bore 64 in a center port member 66 to a main piston 68. An auxiliary piston 70 is mounted to the piston rod to move within the barrel between the center port member 66 and end piece 58. The main piston 68 and auxiliary piston 70 each have annular grooves containing O-rings 71 to provide a seal with the interior surface of the barrel 56.

A primary port member 72 is mounted between the center port member and cap. The primary port member 72 has a forward stroke Port $P_1$ and the center port member has a forward stroke Port $P_2$. The forward stroke ports ($P_1$ and $P_2$) are connected to a source of pressurized fluid, such as compressed air (not shown). When compressed air is introduced into the cylinder through $P_1$ and $P_2$, the main piston 68 and auxiliary piston 70 are forced to move the piston rod and electrode 54 in a direction shown by Arrow A in FIG. 4 forward towards the work piece 12. The center port member 66 has a Port $P_3$ for introduction of pressurized air into the barrel to act on the main piston 68 to return the piston rod 50 from the work piece in a direction shown by Arrow B of FIG. 6.

Figure 4:
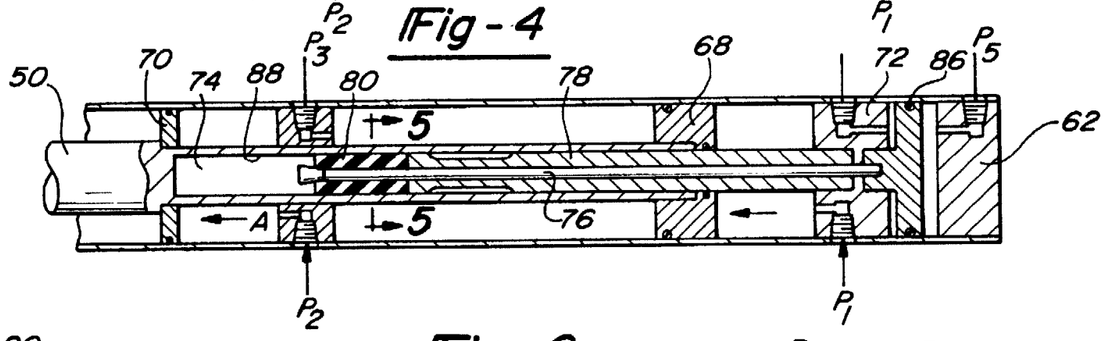
FIG. 4 is a sectional view of a portion of the pneumatic cylinder with the piston in an extended position and a brake in an unlocked position.
Figure 6:
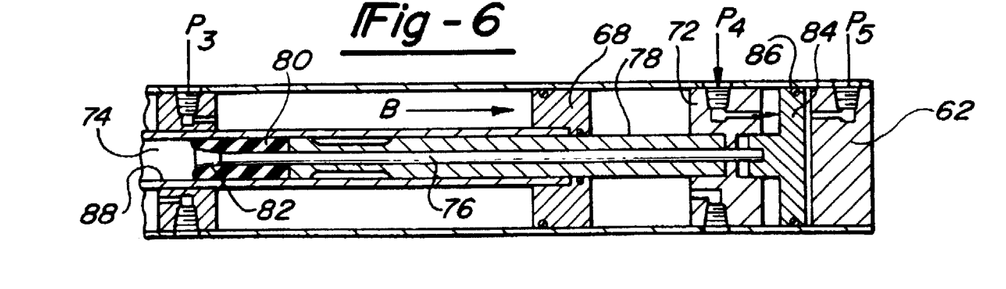
FIG. 6 is a sectional view of the pneumatic cylinder with the brake in a locked position.

As shown in FIGS. 3, 4 and 6, the piston rod 50 has an axial bore 74 extending from the end piston 68 to the center piston 70. Disposed within the bore 74 is a brake rod 76 supporting a cylindrical spacer 78 and brake wedges 80 for mechanically locking the piston rod in position. One end of the spacer 78 is fixedly mounted within a bore of the primary port member 72. An axial throughbore extends through the spacer 78 and primary port member 72 and brake wedges 80 for slidingly accepting the brake rod 76.

Figure 5:
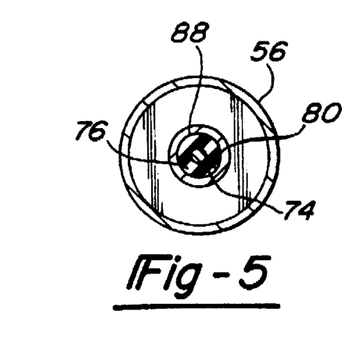
FIG. 5 is a cross-sectional view of the pneumatic cylinder and brake taken along lines 5—5 of FIG. 4.

A frusto-conical mandrel 82 is attached at one end of the brake rod adjacent the brake wedges 80. A brake piston 84 is attached to the opposite end of the brake rod 76. The brake piston 84 is disposed in the cylinder barrel between the primary port member 72 and cap 62 and has an O-ring 86 disposed in an annular groove, as best shown in FIGS. 5 and 6. The brake piston 84 is displaceably away from the primary port member 72 by compressed air received through Port $P_4$. Movement of the brake piston 84 away from the primary port member 72 results in the movement of the piston rod and brake mandrel 82 in the direction shown by Arrow B inwardly against the brake wedges 80. As the brake mandrel moves inwardly, the brake wedges 80 are forced radially outward by the brake cap against an interior cylindrical surface 88 of the bore of the piston rod, balancing the frictional force of the brake against the expansion force of the work piece. Each brake wedge is formed of a suitable rigid heat resistant material which is used in automotive brake linings. The brake wedges have a cylindrical outer surface having a circumference slightly smaller than the interior surface 88 of its base.

The force of the brake wedges on the cylindrical surface of the bore is a predetermined frictional force equal to or slightly greater than the force of expansion created by the metal as it is being heated by the welding current. Thus, the frictional force holds the electrode against outward displacement during the expansion of the work piece. However, once the metal softens and the counterforce of the work piece to the squeezing force of the electrodes is reduced, the squeezing force overcomes the frictional force and reduces counterforce to permit the piston rod 50 and electrode 54 to move inwardly. The pressure equalizing device permits electrode 54 to indent the work piece after the metal softens, thus producing a weld of superior quality and consistency.

The brake wedges are released by introducing pressurized air through Port $P_5$ to act against the brake piston 84 to move the brake rod 76 and brake mandrel 82 in a direction away from the brake wedges shown by Arrow A of FIG. 4. The biasing member 22 moves the slide bar to return the electrodes to the starting position.

Figures 7, 8, 9, 10, 11:
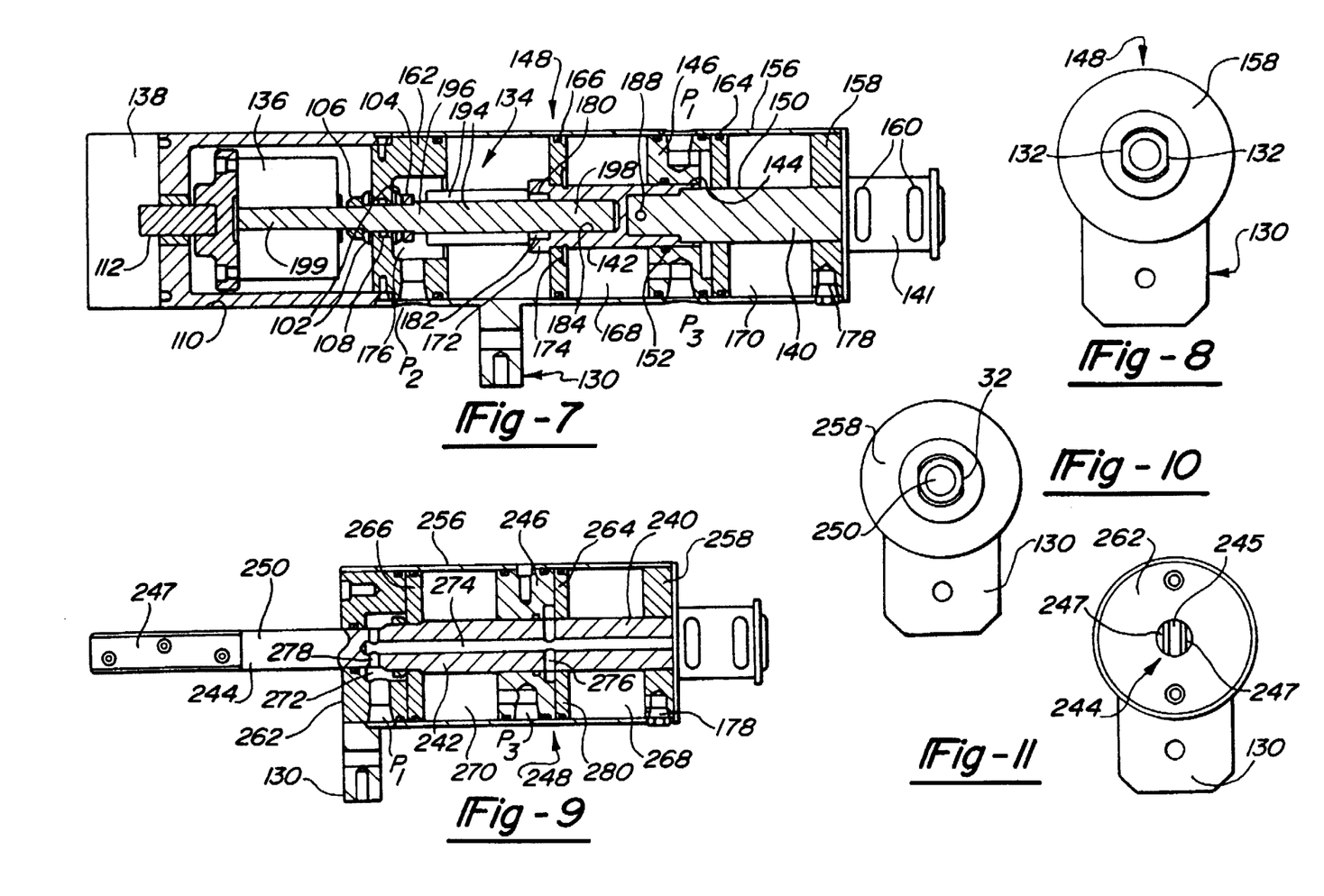
FIG. 7 is a sectional view of a pneumatic cylinder in accordance with a first preferred embodiment of the invention.
FIG. 8 is an end view of the pneumatic cylinder and a piston rod in accordance with the invention.
FIG. 9 is a sectional view of a pneumatic cylinder in accordance with a second preferred embodiment of the invention.
FIG. 10 is an end view of a working end of the pneumatic cylinder in accordance with the second preferred embodiment of the invention.
FIG. 11 is an end view of an opposite end of the pneumatic cylinder in accordance with the second preferred embodiment of the invention.

A first preferred alternative embodiment of a pneumatic cylinder 148 for use in a welding apparatus 10 is shown in FIGS. 7 and 8. The cylinder 148 includes a ball screw assembly 134, a unidirectional clutch 136 and a brake assembly 138. The pneumatic cylinder 148 is mounted to the mounting bracket 36 of the pressure equalizing device as described above (FIG. 1) by bolts (not shown) which engage a flange 130.

As best shown in FIG. 7, the pneumatic cylinder 148 includes a cylinder barrel 156 mounted to an end piece 158 and a cylinder cap 162. The piston rod 150 is reciprocally movable through an aperture in the end piece 158. The piston rod has a working end portion 140 and inner end portion 142. As shown in FIG. 8, the working end portion 140 has a pair of flat surfaces 132 which mate with corresponding surfaces of the aperture of the end piece to hold the rod 150 in alignment as it moves. The working end 140 has a mount 141 with slots 160 for mounting of the electrode holder 52 for supporting the electrode 54 in the same manner as discussed above. The inner end portion 142 may be separately formed and threadably attached to the working end portion 140. A roll pin 188 is used to lock the inner end portion to the rod 150. The inner end portion 142 includes a flange 172 and stepped axial bore 180. The piston rod 150 is supported within the barrel 156 in an axial bore 144 in a cylinder head 146. The bore 144 has an O-ring 152 in a slot to provide a seal.

An inner cylinder head 164 and an outer cylinder head 166 are mounted to the rod. The inner piston head 164 moves in a first chamber 168 between the end piece 158 and cylinder head 146. The outer piston head 166 moves in the second chamber 170 formed between the cylinder head 146 and the cap 162. The outer piston head 166 is held in position on the piston between the flange 172 on the inner end portion 142 of the rod and a retaining ring 174 mounted in a circumferential slot formed on the rod.

A forward stroke Port $P_1$ opens into an annular passageway 174 to introduce pressurized air to act on the inner piston head 164. A second forward stroke Port $P_2$ is provided in the cylinder cap 162 having a passage 176 for introducing pressurized air into the second chamber 170 to act on the outer piston head 166 to extend the rod. Pressurized air is supplied to both $P_1$ and $P_2$ at the same time to extend the rod. A return Port $P_3$ is positioned in the cylinder head 146 to permit pressurized air to be introduced into the second chamber 170 to move the outer piston head 166 away from the cylinder head 146 to actuate a return stroke. A breather 178 is mounted in the end piece 188 to permit introduction and expansion of ambient air into a non-working portion of the cylinder.

The ball screw assembly 134 includes a ball screw nut 194 and a ball screw rod 196. The ball screw nut is threadably attached to an outer threaded portion 182 of the axial bore 180 of the inner rod. The ball screw rod 196 has a threaded end portion 198 and a smooth end portion 199. The threaded end portion 198 is threadably received within a threaded bore of the ball screw nut 194 and an inner threaded portion 184 of the axial bore 180.

The ball screw rod 196 is supported for rotation within the cylinder cap 162 by a thrust bearing assembly, including two needle thrust bearing packages 102. One thrust bearing 102 is mounted between a collar 104 on the ball screw rod 196. The other is mounted between the end cap 162 and a bear hug nut 106. The needle thrust bearing assembly is advantageously provided to permit the ball screw rod 196 to rotate freely within the cap 162 and absorb the axial thrust which occurs as the result of the movement of the rod 150. An O-ring 108 is disposed in the cylinder cap about the ball screw rod 196 to seal the cylinder.

The unidirectional clutch assembly 136 is mounted to the smooth end portion 199 of the ball screw rod 196 within a cylinder housing 110 which is fixedly mounted to the cylinder cap 162. The unidirectional clutch assembly 136 may be of any conventional type, such as Model FSO 300 manufactured by Warner Brake. The unidirectional clutch assembly 136 permits rotation of the ball screw rod 196 in one direction only when the clutch assembly is held against rotation by the brake assembly 138. The brake assembly 138 is of any conventional type, such as produced by Warner Brake, and is mounted to engage a brake rod 112 extending from the unidirectional clutch assembly. The brake rod 112 is mounted in a needle bearing 114. The electric brake assembly 138 has brake shoes (not shown) which are biased into engagement with the brake rod 112 to prevent rotation of the unidirectional clutch assembly 136. Because the rod 150 is held against rotation by the flat surfaces 132, the ball screw rotates in a first direction, for instance, clockwise, when the rod 150 is extended outwardly and rotates in an opposite direction, for instance, counterclockwise, when the rod 150 is returned.

When the electric brake assembly 138 is energized, the ball screw rod 126 is free to rotate in either direction to move the rod 150. However, when the electric brake assembly 138 is de-energized, the brake rod 112 and unidirectional clutch assembly 136 are locked against rotation. The unidirectional clutch assembly then is selectively operable to permit the ball screw rod 196 and piston rod to move in only one direction.

Thus, the first preferred alternative embodiment of the cylinder 148 advantageously locks the rod 150 and electrodes from outward displacement during expansion of the weld nugget. The pneumatic cylinder applies a squeezing force in the same manner as disclosed above. When the brake assembly 138 is energized, the rod 150 and electrodes 42 and 54 are locked against outward movement during expansion of the work piece. However, the squeezing force which is applied through ports $P_1$ and $P_2$ to force the electrodes together against the work piece is sufficient to move the electrodes together after the metal softens and the counterforce is overcome. The inward movement of the electrode is permitted by the ball screw assembly and unidirectional clutch assembly. Thus, the first preferred embodiment does not require balancing the frictional force with the expansion force as disclosed above to permit a precise control of the movement of the electrodes during the welding cycle.

A second preferred embodiment of a pneumatic cylinder 248 with a caliper assembly is shown in FIGS. 9, 10, 11, 12, 13 and 14. As shown in FIG. 9, the pneumatic cylinder 248 has a cylinder barrel 256 enclosed by an end piece 258 and a cap 262. The pneumatic cylinder 248 has a reciprocally mounted rod 250. The rod has an intermediate portion 242 extending between a working end 240 and a rod extension 244. The working end 240 is formed as discussed above for the first preferred embodiment.

As shown in FIGS. 9 and 11, the rod extension 244 has a pair of spaced apart flat surfaces 245 having friction members 247 mounted thereto. The end piece 258 and cap 262 have apertures formed to permit reciprocal movement of the rod 250. A flange 130 extends from the cylinder cap 262 for mounting to the mounting bracket 36 (as discussed above).

A cylinder head 246 is mounted in the cylinder 248 to form a first chamber 268 and a second chamber 270. An inner piston 264 is mounted to the rod 250 in the first chamber 268 and an outer piston 266 is mounted in the second chamber 270. The cap 262 has a Port $P_1$ communicating by way of a passageway 272 with a radial bore 278 in the rod 250. The rod 250 has an axial bore 274 extending from the radial bore 278 to a second radial bore 276 disposed adjacent the inner piston 264. Pressurized air enters Port $P_1$ to extend the rod 250. The pressurized air is delivered into the passageway 272 to act on the outer piston head 266 and through the radial bores 272, 276 and axial bore 274 of the rod to a passageway 280 formed in the cylinder head 246 to act on the inner piston 264 and thereby extend the rod 250. Port $P_3$ is formed in the cylinder head 246 to deliver air into the second chamber 270 to act on the outer piston 266 to retract the piston 250. A breather 178 is mounted in the end cap to permit introduction and expulsion of ambient air from a nonworking portion of the first chamber.

Figure 12:
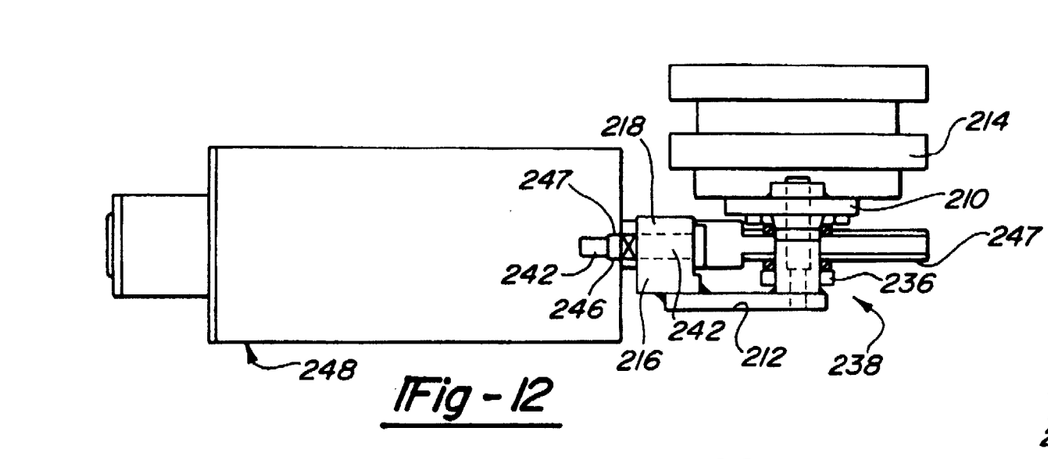
FIG. 12 is a top view of the pneumatic cylinder and a brake assembly in accordance with the second preferred embodiment.
Figure 13:
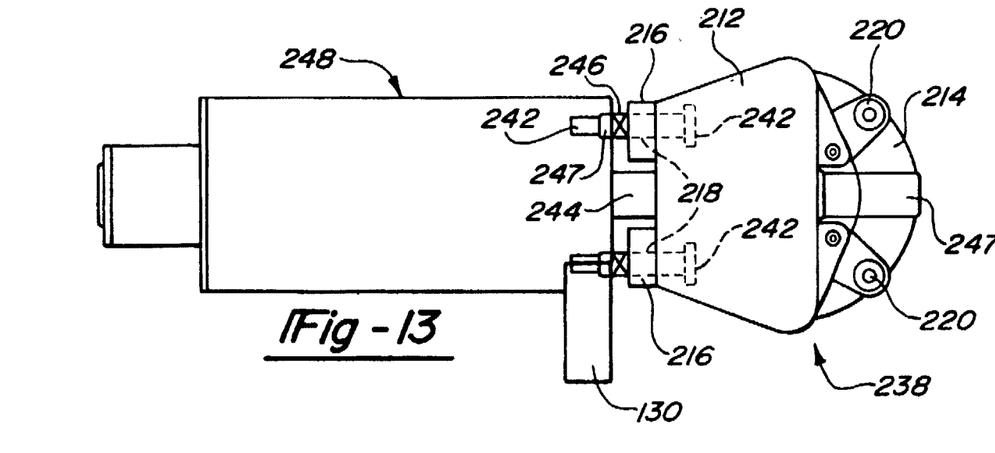
FIG. 13 is a side view of the pneumatic cylinder and a brake assembly in accordance with the second preferred embodiment.
Figure 14:
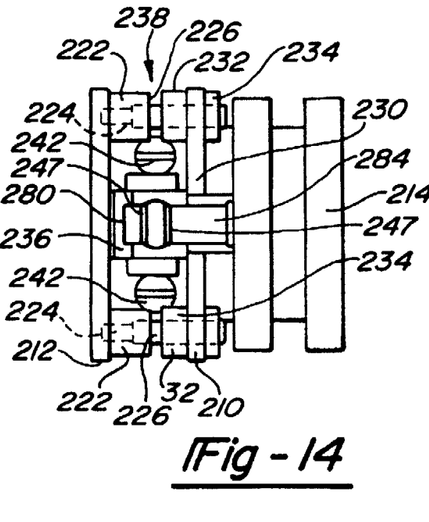
FIG. 14 is an end view of the brake assembly in accordance with the second preferred embodiment.

A caliper assembly 238 is shown in FIGS. 12, 13, and 14. As shown in FIGS. 12 and 13, a caliper assembly 238 is mounted to the cylinder cap 262 of the cylinder by a pair of threaded bolts 242. The caliper assembly 238 includes an inner plate 210, an outer plate 212 and an actuator 214. The outer plate 212 has a pair of blocks 216. Each block 216 has a bore 218 to accept one of the pins 242 and a bushing 220. Disposed on each bolt 242 is a spring 246 and bushing 247 between the cylinder cap 262 and blocks 216 to bias the assembly 238 away from the cylinder cap 262. As shown in FIG. 14, the outer plate 212 has two spacers 222 mounted on an inner side. The spacers 222 include a pair of bores 224 for accepting pins 226 for mounting the outer plate to the inner plate 210. The inner plate 210 is generally planar, having a center opening 230 and a pair of cylindrical mounts 232 with throughbores 234 disposed to accept the pins 226. The inner and outer plates are disposed on either side of the rod extension 244 and friction members 247. A U-shaped support member 236 is welded to the inner plate 210 to extend over the center opening 230 between the inner and outer plate and around the rod extension 244. A friction plate 280 is mounted in the center of the support member 286 parallel and spaced apart from the friction member 247 of the rod 244. As shown in FIG. 14, the actuator 214 is a pneumatic cylinder having an actuator rod 284. The actuator 214 is mounted by screws 220 to the inner plate. The actuator rod is disposed to be directed into the center opening 230 of the inner plate towards one of the friction plates 247.

As shown in FIG. 14, the friction members 247 are disposed between the friction plate 280 and actuator rod 284 of the brake cylinder which are advantageously all formed of the same material. Thus, when the actuator rod 284 is extended, it contacts the friction plate 247 of the extension rod 244 and draws the friction plate of the inner plate against the opposite side of the extension rod 244 by pushing against the rod 244 like a caliper. In this way, the rod and electrodes are held against outward displacement during the expansion of the work piece. However, the brake assembly is free to move inwardly on the bolts 242 to indent the weld nugget after expansion when the squeezing force of the electrodes overcomes the counterforce of the metal work piece and the brake assembly then moves inwardly by compressing the springs 246 on the bolts 242.

Figure 15:
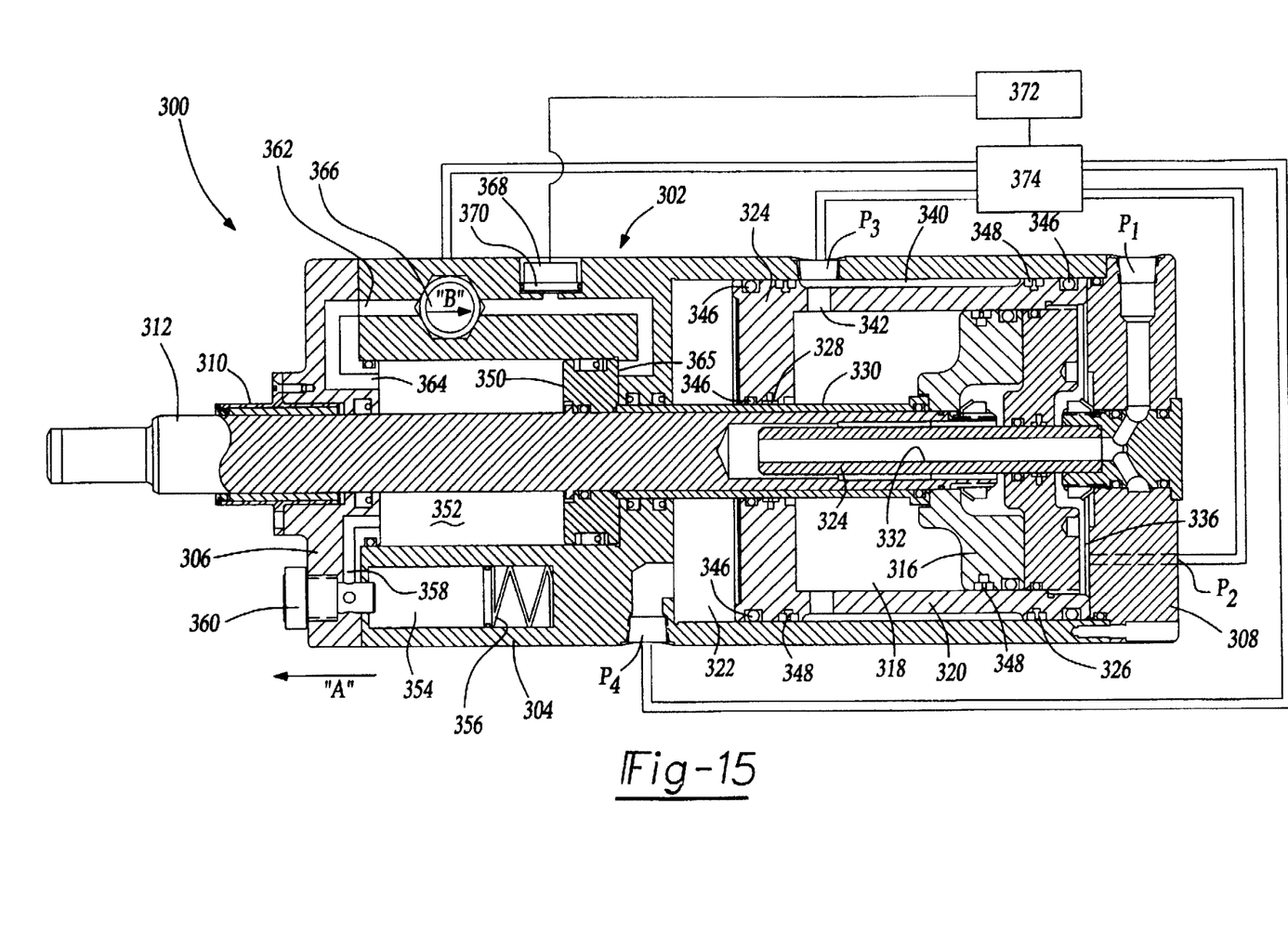
FIG. 15 is a sectional view of a pneumatic cylinder in accordance with the third preferred embodiment of the invention.

As shown in FIG. 15, a third preferred alternative embodiment of the invention includes a pneumatic cylinder 300 having a reciprocally movable rod 312 and a hydraulic brake circuit 302. The rod 312 is locked against outward movement from the work piece by a hydraulic brake circuit 302. The cylinder may be used with any conventional welding apparatus, such as the welding apparatus 10 discussed above. The pneumatic cylinder 300 includes a cylindrical housing 304 having an end cap 306 closing one end of the cylinder and an end piece 308 having a rod guide 310 for guiding a reciprocally movable rod 312. The cylinder has a conventional two-stage movement. The cylinder 300 includes a primary piston 316 mounted to the rod 312 and reciprocally movable for a first stage within an inner chamber 318 of an inner cylinder 320.

Pneumatic pressure from Port $P_1$ extends the rod and pressure from Port $P_3$ retracts the rod. Pressurized air is introduced into Port $P_3$ in the cylindrical housing 304 to pass into a groove 340 formed in the outer surface of the inner cylinder through a passageway 342 into the inner chamber 318. The pressurized air then acts against a forward side of the piston 316 to move the piston and piston rod rearwardly in a direction opposite to that of Arrow A.

The second stage movement is accomplished by moving the inner cylinder 320. The inner cylinder 320 has a cylindrical body having a closed end 324 at a forward end of an outer chamber 322 and an inner cap 326 mounted at an opposite rear end of the chamber 322. The closed end 324 has an aperture 328 to accept the rod 312 and a sleeve 330 mounted on the rod 312. The inner cap 326 has an axial bore 332 formed to accept an inlet tube 324 extending axially into the cylinder from the outer end piece 306. The inner cylinder is moved forwardly in the direction of Arrow A by pressurized air delivered through Port $P_2$ in the end cap 306 into a chamber 336 formed behind the inner cap 326. When the inner cap 326 is moved by pressurized air in a forward direction it pushes the inner piston 316 to move the piston rod 312 in the forward direction of Arrow A. The inner cylinder 320 is retracted by introducing pressurized air into Port $P_4$ formed in the cylinder housing 304. Pressurized air enters the outer chamber 322 outside of the closed end 324 to move the inner cylinder 320 in the rearward direction. O-rings 346 and wear bands 348 are mounted to the inner cylinder 320 and piston 316 to seal the inner and outer chambers.

The hydraulic brake circuit 302 includes a hydraulic piston 350 movable within a hydraulic chamber 352 formed in the forward end of the cylinder 300. The hydraulic piston 350 is mounted at a forward end of the sleeve 330 to thus move with the rod. A fluid reservoir 354 having a spring biased piston 356 is formed in the housing 304 to supply hydraulic fluid in the event of leakage to the hydraulic chamber 352 by passage 358. A check valve 360 is mounted in the passage 358. A brake passage 362 is formed to extend from a forward end 364 of the hydraulic chamber 352 in a loop through the housing to a rearward end 364 of the chamber. A one-way check valve 361 is mounted in the passage 362. The check valve 366 is a pilot operated oneway check valve. When no pilot pressure is applied, fluid is permitted to flow only in the direction indicated by Arrow B. Thus, when the rod 312 is moved in the forward direction by pneumatic pressure, hydraulic fluid moves from the forward portion 364 of the hydraulic chamber through the passage 362 and one-way check valve 366 into the rear portion 365 of the chamber. Since the check valve prevents fluid from moving from the rear portion 355 of the cylinder, the piston 350 and rod 312 can move forwardly into a work piece. Thus, the piston 350 and rod can move outwardly from the cylinder and into the weld nugget when the nugget softens. But the rod is locked against movement away from the work piece and into the cylinder when the weld nugget expands.

A load sensor 368 having a piston 370 is mounted in the housing in fluid communication with the passage 362 to monitor the pressure in the hydraulic fluid for controlling the weld cycle. A signal from the sensor is delivered to a computerized controller 372. When the load in the hydraulic circuit is reduced by softening of the nugget, the controller 372 initiates a return cycle. The controller 372 terminates weld current and activates a valve 374 to deliver pneumatic pilot pressure from a pressure source to the check valve 362. The pilot pressure opens the check valve for two-way flow. The controller also closes delivery of air pressure to $P_1$ and/or $P_2$ and delivers pressure to $P_3$ and/or $P_4$ to pneumatically retract the pistons and rod. Because pilot pressure is applied to the check valve, hydraulic fluid in the rear portion 365 of the hydraulic chamber is permitted to flow through the check valve 366 into the forward portion 364 of the hydraulic chamber 362 as the rod is retracted.

Figure 16:
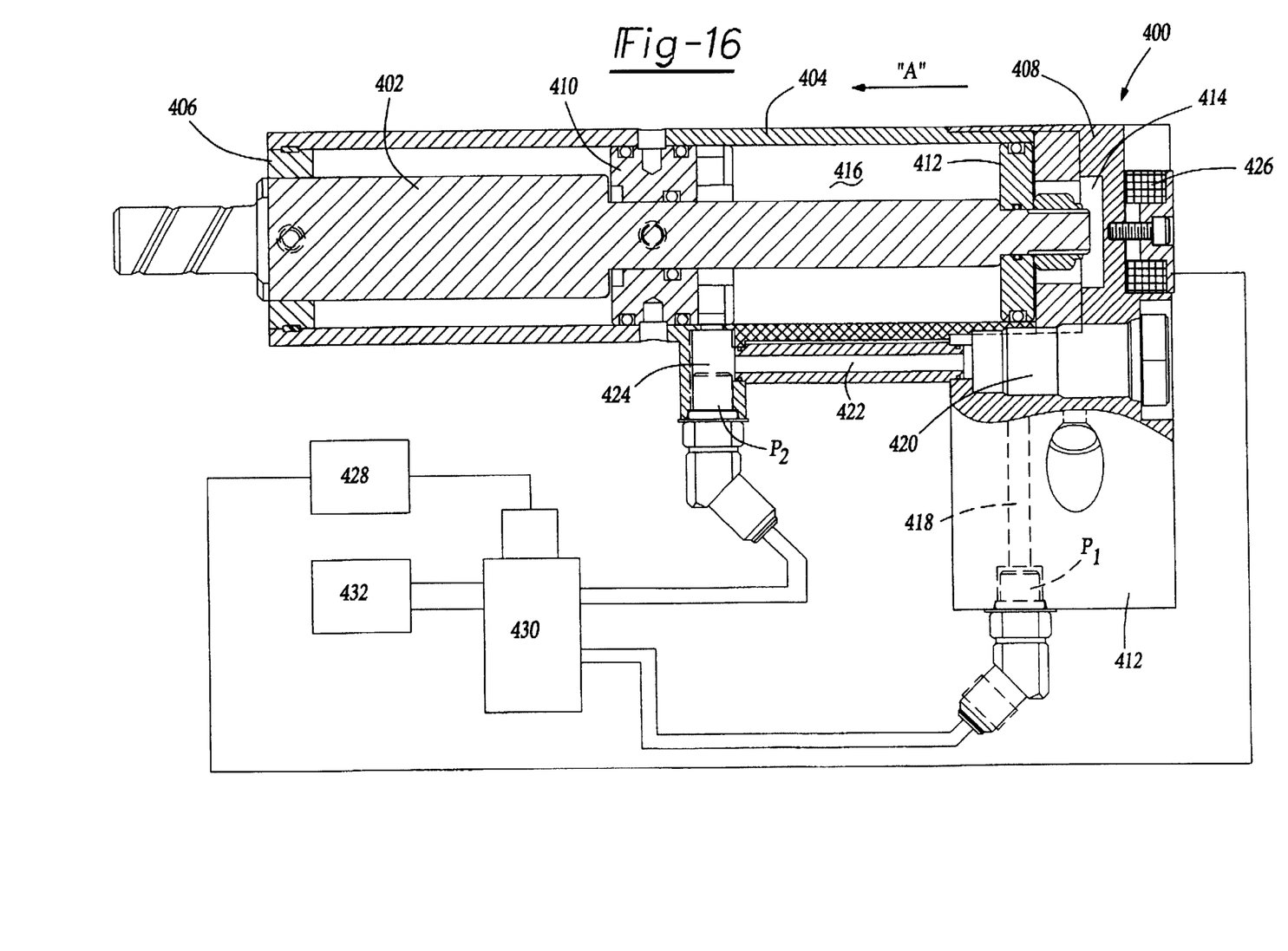
FIG. 16 is a sectional view of a hydraulic cylinder in accordance with the fourth preferred embodiment of the invention.

A fourth preferred embodiment of the invention is shown in FIG. 16. A hydraulic cylinder 400 with a rod 402 is reciprocally movable within a cylindrical housing 404. The rod 402 moves forwardly from the cylinder 400 to the work piece in the direction of Arrow A and the rod 402 moves rearwardly in an opposite direction from the work piece during the return stroke. The rod is guided for movement by a rod guide 406 and a bore in an intermediate wall 410. A piston 412 is attached to a rearward end of the rod to move within a hydraulic chamber 414 formed between an end piece 408 and the intermediate wall 410. The end piece 408 has a rectangular extension 412 having a hydraulic fluid Port $P_1$ for communicating hydraulic fluid from a source 432 of pressurized fluid through passage 418 to the chamber 414. A one-way pilot operated check valve 420 is mounted in the passage 418. The check valve is normally open to permit fluid to pass in only the direction from the Port $P_1$ to the chamber 414. In the same manner as discussed above for the third preferred embodiment, the one-way check valve 420 prevents fluid from passing from the chamber and locks the rod from moving rearwardly during the weld cycle.

Port $P_2$ is formed in the middle portion of the housing to deliver fluid through a passage 424 into a forward end of the chamber 414. An axial bore 424 connects the passage 422 with an end of the check valve to deliver a pilot pressure for opening the check valve. When the check valve is open, fluid is permitted to flow in either direction through the check valve and allows retraction of the rod and piston from the extended position. Thus, when the flow of hydraulic fluid is delivered through Port $P_2$, pilot pressure is delivered from the passage 422 to the bore 424 to open the check valve 420 and the main flow of fluid in the passage 422 is delivered to the forward end of the hydraulic chamber to move the rod 402 in the rearward direction. A load sensor 426, such as a Kissler strain gauge, is mounted on the end piece 408 of the cylinder. When the nugget softens, a signal is sent to the controller 428 to terminate the weld current and to switch a valve 430 to direct the flow of oil from Port $P_1$ to Port $P_2$ for the return stroke. Thus, as disclosed above, the check valve prevents outward movement of the electrode and rod during expansion of the nugget and permits movement of the rod into the work piece after the nugget softens.

Figure 2:
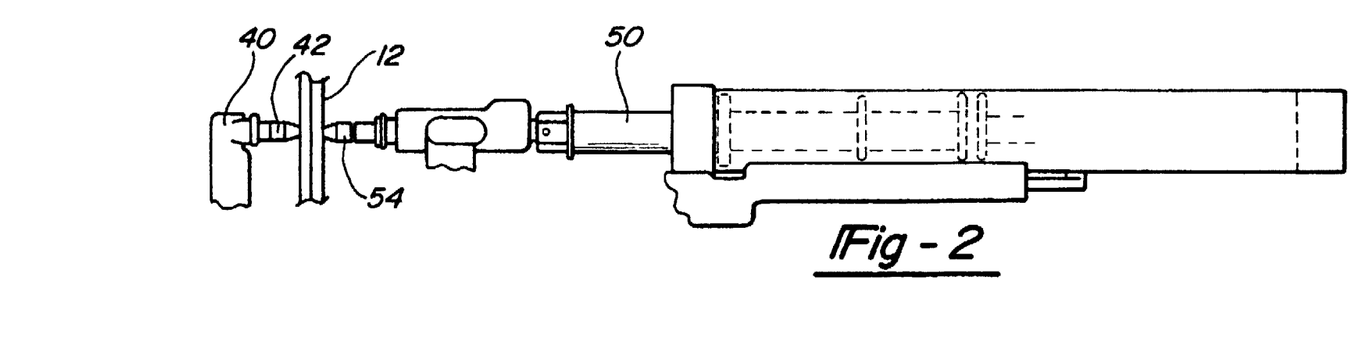
FIG. 2 is a partial side view of the welding apparatus in accordance with the invention shown with an electrode arm in an extended position for welding.

The method of operation of the improved welding apparatus according to the invention includes first positioning the electrodes 42 and 54 on either side of the work piece 14, as best shown in FIG. 1. As shown in FIG. 2 and FIG. 4, pressurized air is introduced into ports $P_1$ and $P_2$ to extend the piston rod 50 and electrode 54 against the work piece. The pressure of the electrode 54 on the work piece forces the outer arm to slide inwardly, drawing electrode 42 against the biasing member to abut the work piece as shown in FIG. 2. The pressure of the electrodes on either side of the work piece is equalized by movement of the slide bar against the biasing force of the spring. The brake is applied to prevent separation of the electrodes during expansion of the work piece. The brake wedges are set by introducing pressurized air through $P_4$, thereby forcing the brake wedges apart against the inner surface of the piston rod bore to mechanically lock the piston rod in position. The welding current is then applied to form a weld nugget. After the nugget has been formed, the current is terminated and the brake is released.

Because an important aspect of the invention is preventing outward displacement of the electrodes during the application of weld current, it is within the contemplation of the invention to adjust the pressure setting the brake at a level which will permit the squeezing force of the cylinder to move the electrodes together after expansion of the weld nugget. Thus, the electrodes are free to move inwardly firmly contacting the weld during contraction of the nugget as it cools.

After the weld has cooled, the electrodes are moved apart and the work piece removed to complete the cycle.

It has been found that locking the piston rod reduces spark expulsion and the increased pressure which results from the expansion of the weld nugget during the application of the weld current results in a much improved weld over previous methods.

It should be clear that variations of the invention may be made without departing from the scope and spirit of the invention. For instance, it is not necessary to have a double piston arrangement as disclosed. Likewise, many variations in the manner in which the electrodes are fixed against outward expansion during the application of the welding current are within the scope of the invention.

We claim:

1. An improved welding apparatus for welding a metal work piece comprising:

a fluid cylinder having a housing having a first piston in a first chamber mounted to a rod for reciprocally moving an electrode to and away from said work piece, said cylinder having a second piston mounted to said rod and disposed in a second chamber formed about the rod, said second piston movable between a pair of ends of said second chamber, said housing having a passage extending from one of said pair of ends to another of said pair of ends of said second chamber, a one-way check valve mounted in said passage to permit hydraulic fluid to pass through said check valve in one direction when said rod is moved in a direction toward said work piece when said valve is in a normal condition, said check valve preventing hydraulic fluid from flowing in an opposite direction through said passage to lock said rod from movement away from said work piece;

means for opening said check valve to permit said rod to be moved away from said work piece.

2. The welding apparatus of claim 1, wherein said fluid cylinder comprises a hydraulic cylinder.

3. The welding apparatus of claim 1, wherein said fluid cylinder comprises a pneumatic cylinder.

4. The welding apparatus of claim 1, wherein said means for opening comprises a passage delivering pilot pressure to said valve.

5. The welding apparatus of claim 3, wherein a load cell is mounted in said housing to monitor said load on said hydraulic fluid for controlling a weld cycle.

6. A welding apparatus for welding a metal work piece comprising:

a fluid cylinder having a load cell mounted to the cylinder;

a means for controlling the weld cycle;

means for delivering a signal from said load cell to said means for controlling.

7. The welding apparatus of claim 6 further comprising a check valve mounted in said fluid cylinder to lock a rod against movement in one direction during the weld current; and means for disabling said check valve to permit movement of said rod in said one direction in response to said means for controlling.

8. The welding apparatus of claim 1, wherein said housing further comprises a storage chamber for a predetermined supply of hydraulic fluid, said chamber being in fluid communication with said second chamber.

* * * * *